Figure 1:
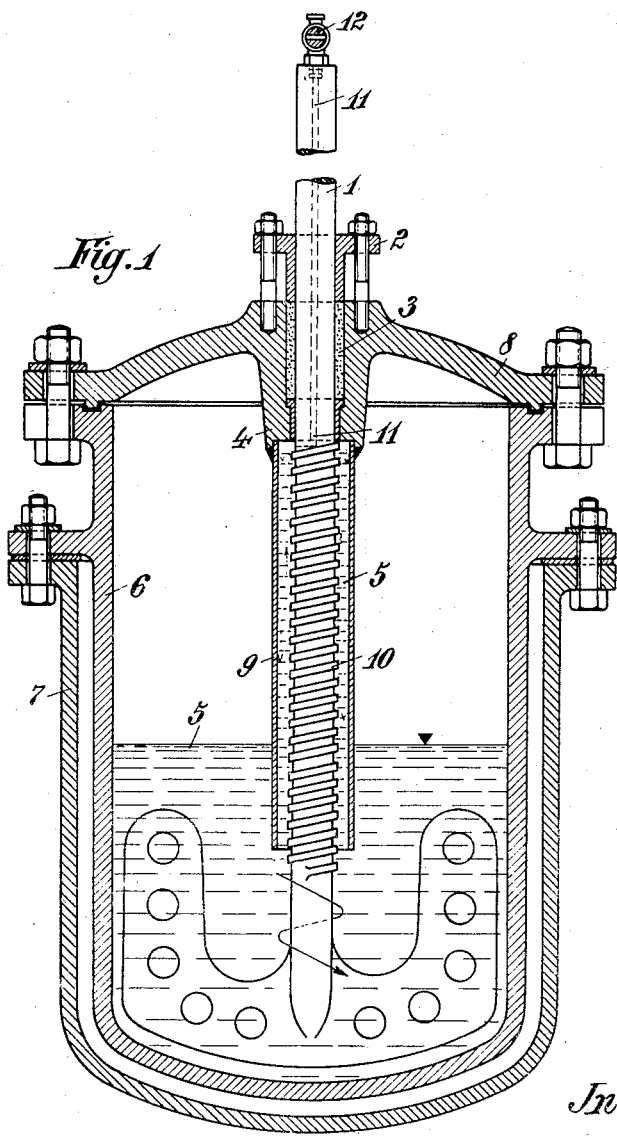

Nov. 8, 1932.  W. BAENSCH  1,887,006
PACKING FOR THE STUFFING BOXES AND COVERS OR LIDS OF APPARATUS
AND MACHINES SUBJECTED TO A HIGH GAS PRESSURE
Filed Jan. 23, 1928  2 Sheets-Sheet 1

Inventor:
Walter Baensch
By
Attorney

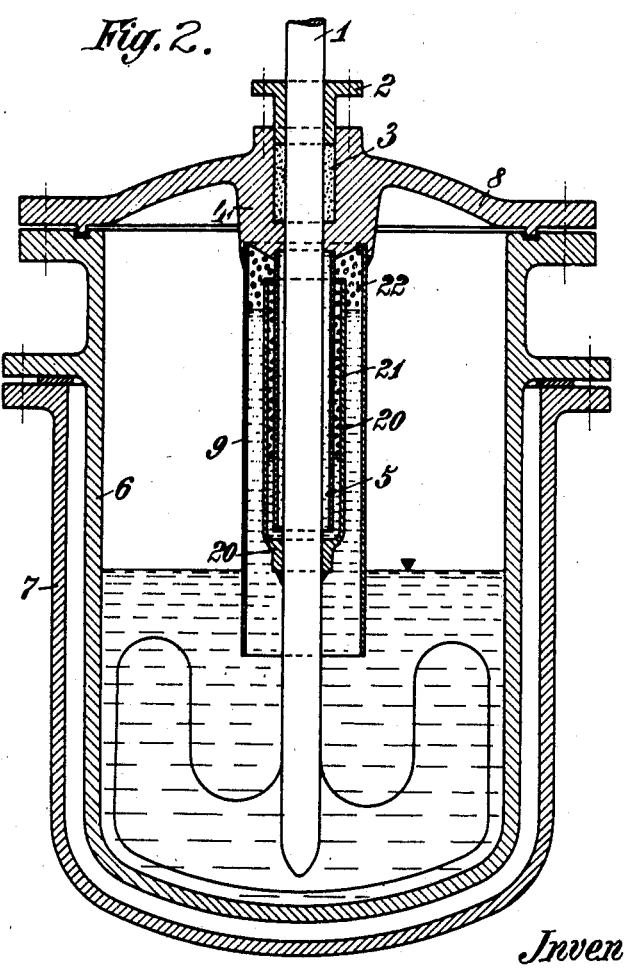

Patented Nov. 8, 1932

1,887,006

UNITED STATES PATENT OFFICE

WALTER BAENSCH, OF BERLIN, GERMANY, ASSIGNOR TO SCHERING-KAHLBAUM A. G., OF BERLIN, GERMANY

PACKING FOR THE STUFFING-BOXES AND COVERS OR LIDS OF APPARATUS AND MACHINES SUBJECTED TO A HIGH GAS-PRESSURE

Application filed January 23, 1928, Serial No. 248,952, and in Germany January 24, 1927.

It is known that it is very difficult to render tight stuffing boxes subjected to the pressure of gases, especially light gases, as for instance hydrogen, which are subjected to a high pressure, and that even if one is successful the stuffing boxes become untight after a short time.

These drawbacks are overcome, according to this invention, by subjecting the stuffing box to the pressure not of a gas, but of the charging liquid of the respective apparatus or machine, or of any other liquid, whereby absolute tightness can be attained.

The invention is illustrated diagrammatically and by way of example on the accompanying drawings, in which Figure 1 is an axial section through an apparatus provided with a stuffing box designed according to this invention; and Figure 2 shows a modification.

Referring to Figure 1, 1 denotes the shaft to be tightened or packed, 2 the gland, 3 the elastic packing material which is subjected to pressure and tension by the gland 2. 4 denotes the stuffing box body, the shape of which may vary in the various cases according to the prevailing requirements. 5 denotes the sealing liquid which is to be pressed, or is pressed against the packing material 3. Figure 1 shows a constructional form intended especially for use in connection with chemical apparatus of the kind in which a liquid or a flux or a solid substance is to be acted on by a gas standing under a high pressure. 6 denotes the vessel enclosing the respective substance, 7 a heating or cooling jacket (as the case may be) for the same, and 8 the cover or lid which is, in the example shown in Figure 1, made integral with the stuffing box body 4.

When the liquid substance 5 is subjected to the action of a gas which is under pressure, especially high pressure, it will rise within the tube 9 which is absolutely tightly welded to the body 4 and dips with its lower end into the liquid substance 5. The air present above the level of the liquid in the tube 9 is forced out of the stuffing box until this latter itself is subjected to the pressure exerted by the liquid. As stuffing boxes can be rendered tight far more easily by means of a liquid and remain tight much longer, the gas cannot possibly escape out of the vessel 6.

The liquid enclosed in the tube 9 is cut off from the chemical action of the gas, but if it is desired that also the liquid enclosed in said tube be acted on by the gas, the shaft 1 which passes through the stuffing box and is rotated in order to turn stirring blades located in the lowermost portion of the vessel 6 and in the liquid there present, as shown in Figure 1, that portion of the shaft 1 which is located in the tube 9 is provided with a worm 10, i. e., a conveying worm, which when the shaft is rotated in the direction indicated by the arrow (seen below the worm) conveys the liquid particles present in its immediate neighborhood upwards, in consequence whereof the liquid particles present in the immediate neighborhood of the inner wall of the tube 9 are moved downwardly so that a certain circulation of the liquid is produced in this way.

It is also possible to omit the worm 10 and to provide instead thereof a longitudinal bore 11 in the shaft 1. This bore commences at a transverse bore located just at the lower end of the stuffing box body 4 and terminates at the end of the shaft where there is provided a valve 12 through which the liquid pressed by the gas through said bores may be conducted, for instance, into a measuring vessel or the like. The liquid is, in contradistinction to what has been explained in the preceding paragraph, moved out of the tube 9 only after the reaction has been finished.

Another construction is shown in Figure 2. In this case the liquid in the vessel 6 cannot come in contact with the stuffing box, nor can the separate sealing liquid come in contact with the gas. There is provided in this case a neutral gas or air space 22 in the upper portion of the tube 9, just below the stuffing box body 4, and another tube 21 also extending downwardly from this body, but which, being shorter, extends into a tubular vessel 20 affixed to the shaft 1 and containing the sealing liquid 5. When the liquid contained in the vessel 6 and intended to react with the gas is subjected to the pressure of the same, a part of this liquid is forced upwards in the tube 9, and the air present above this part of the liquid is caused to press upon the sealing liquid in the vessel 20 which then is pressed upwards of the tube 21 where it seals the shaft and the packing material in the stuffing box 2, 3.

The stuffing boxes designed according to this invention afford a reliable control as to how far the packing material must be subjected to pressure or tension. Hitherto a certain experience was required therefor, but now, if that pressure or tension is insufficient, liquid escapes slowly from out of the stuffing box whereby it is indicated that a higher pressure or a stronger tension is necessary. Besides, absolute absence from danger exists if poisonous or inflammable or explosive, etc. gases or liquids are to be dealt with. Finally, I wish it to be understood that I do not limit myself to the details shown in connection with various constructional forms shown merely by way of example, nor to these constructional forms in general, in that there exist many more opportunities in the industries concerned in which the invention can be successfully applied.

I claim as my invention:—

1. A stuffing box for apparatus and machines subjected to the high pressure of a gas intended to act upon a liquid also enclosed in the respective apparatus or machine, comprising in combination with the stuffing box proper, a tube extending from the stuffing box proper down into the respective liquid and being filled with the same so as to have a part of it inserted between the stuffing box proper and the gas.

2. A stuffing box for apparatus and machines subjected to the high pressure of a gas intended to act upon a liquid also enclosed in the respective apparatus or machine, comprising in combination with the stuffing box proper, a tube welded to the stuffing box proper and extending from it down into the respective liquid and being filled with the same so as to have a part of it inserted between the stuffing box proper and the gas.

3. A stuffing box for apparatus and machines subjected to the high pressure of a gas intended to act upon a liquid also enclosed in the respective apparatus or machine, comprising in combination with the stuffing box proper, a shaft or rod extending therethrough, a tube extending from the stuffing box proper down into the respective liquid and filled with the same so as to have a part of it inserted between the stuffing box proper and the gas, a valve arranged at the outer end of the shaft or rod extending through the stuffing box and having a longitudinal bore extending from said valve to the space enclosed by said tube.

4. A stuffing box for apparatus and machines subjected to the high pressure of a gas intended to act upon a liquid also enclosed in the respective apparatus or machine, comprising in combinaton with the stuffing box proper, a rod extending therethrough, a tube extending from the stuffing box proper down into the respective liquid and being filled with the same so as to have a part of it inserted between the stuffing box proper and the gas, a valve arranged on the outer end of the rod extending through the stuffing box and having a longitudinal bore extending from said valve to the space enclosed by said tube, and a worm upon the rod portion surrounded with the tube.

5. A stuffing box for apparatus and machines subjected to the high pressure of a gas intended to act upon a liquid also enclosed in the respective apparatus or machine, comprising in combination with the stuffing box proper, means by which a part of the respective liquid, a neutral gas, and another liquid seal are inserted between the stuffing box proper and the first-mentioned gas, the neutral gas being located between said two liquids.

In testimony whereof I have affixed my signature.

WALTER BAENSCH.